(No Model.)
W. B. PALMER.
DISTRICT TELEGRAPH SIGNAL BOX.
No. 308,922. Patented Dec. 9, 1884.
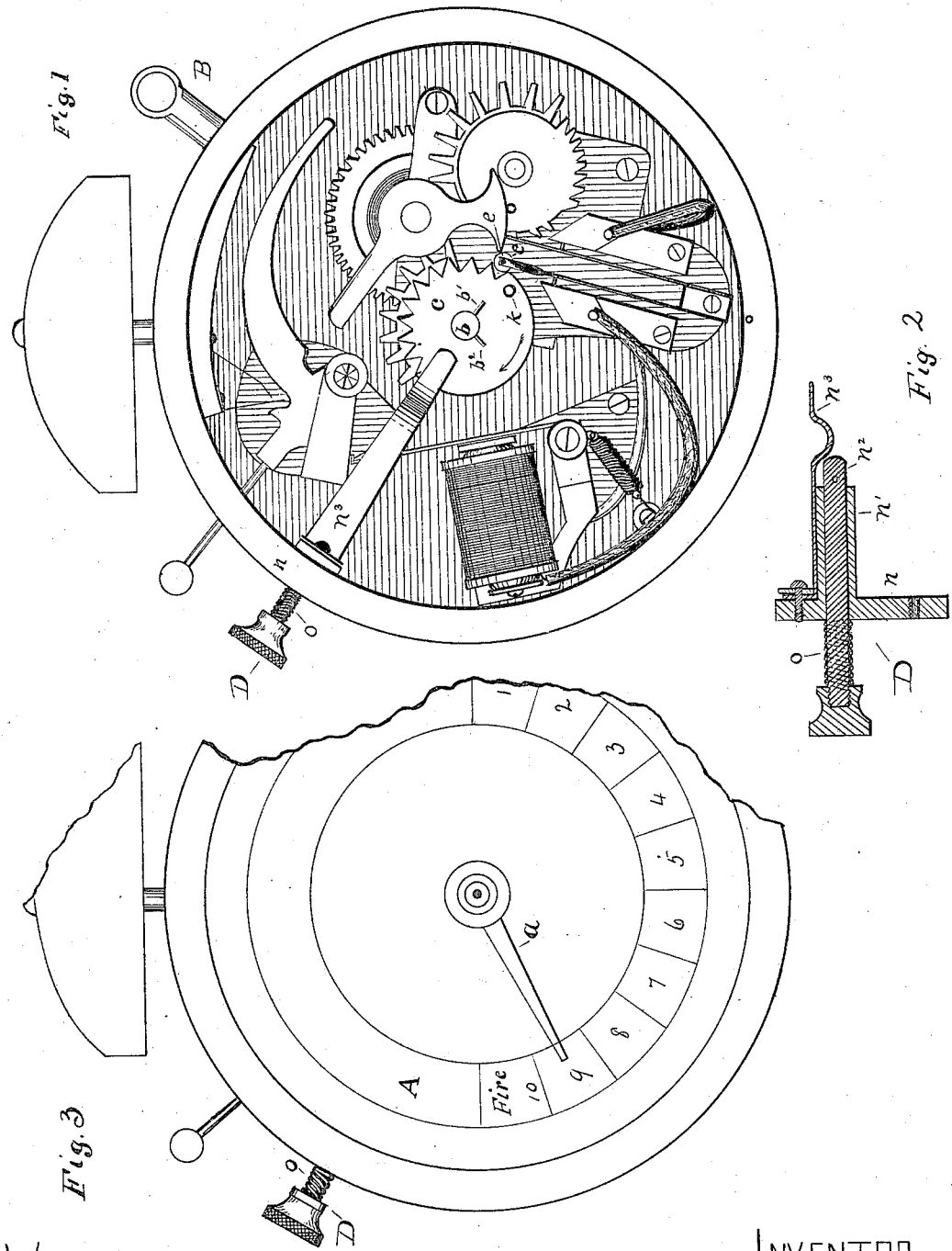
Witnesses
Robt. C. Kalkhoff
W. A. Moore
Inventor
William B. Palmer
By P. H. Gunckel
Attorney.

UNITED STATES PATENT OFFICE.

WILLIAM B. PALMER, OF MINNEAPOLIS, MINNESOTA, ASSIGNOR OF ONE-HALF TO JAMES C. HAYNES, OF SAME PLACE.

DISTRICT-TELEGRAPH SIGNAL-BOX.

SPECIFICATION forming part of Letters Patent No. 308,922, dated December 9, 1884.

Application filed March 22, 1884. (No model.)

*To all whom it may concern:*

Be it known that I, WILLIAM B. PALMER, a citizen of the United States, residing at Minneapolis, in the county of Hennepin and State of Minnesota, have invented certain new and useful Improvements in District-Telegraph Signal-Boxes; and I do hereby declare the following to be a full, clear, and exact description of the invention, such as will enable others skilled in the art to which it appertains to make and use the same, reference being had to the accompanying drawings.

In operating signal-boxes as commonly constructed, in which no means is provided for preventing a free turning of the signal-indicator or pointer to all numbers on the dial, annoying mistakes frequently occur by reason of the pointer being turned beyond the desired number; and it is the object of this invention to provide an attachment for preventing the turning of the pointer beyond an established point unless the locking device of the improvement be released, which requires the attention of the sender of the signal, and lessens the liability of his giving a wrong signal. This object is effected by means of the mechanical devices illustrated in the accompanying drawings, in which—

Figure 1 is a front view of a signal-box containing the improvement, the dial and face plate being removed. Fig. 2 is a detail view in section of the locking device; and Fig. 3 a broken view of the front, showing the dial and indicator of the box.

In the drawings, A is the dial for indicating the different services for which signals may be given.

$a$ is a pointer to be turned to the number or service desired to be signaled. This pointer has a sleeve fitting over the center-post $b$, and the sleeve is slotted to receive the pin $b'$, by which it is prevented from turning on the post $b$.

$c$ is a service or call-wheel secured rigidly by a slanting pin, $b^2$, passed through it into the post $b$, and is provided with a segment of cogs corresponding in number to the number of signals or services the instrument is arranged to transmit.

When it is desired to signal a given number, the pointer is turned to that number on the dial. By this operation the call-wheel $c$ is turned in the direction indicated by an arrow in Fig. 1, and as many of the call-wheel cogs pass by the roller-wheel $e$ as are indicated by the number to which the pointer has been advanced. Thus, if the pointer be turned to the number 9 on the dial, nine of these cogs will pass beyond the roller-wheel $e$ in the direction of the arrow. Now if the crank B be operated, the signal transmitted will be determined by the number of cogs on the wheel $c$ returning past the roller-wheel $e$, whereby the electric circuit is alternately opened and closed as many times as there are cogs passing.

In the signal-boxes as commonly constructed and arranged the more important and less frequently used signals—such as fire-signals—are made the last numbers on the dial; but as the pointer is allowed to be turned freely to all numbers, the operator not infrequently advances the pointer beyond the service he desires, and reaches one of these numbers, occasioning an annoying result. To obviate this defect in the instrument, I provide the short post $k$ on the call-wheel and the device D for engaging and locking it at any desired point in the revolution of the wheel $c$, so as to prevent more than the desired number of cogs from passing the roller-wheel $e$.

The device D is fastened at the side of the box by a screw through its upright portion $n$, and from this part $n$ there projects inwardly a tubular arm, $n'$, through which a rod, $n^2$, is inserted from the outside of the box, a small hole being made in the box for that purpose. About this rod, outside of the box, is fitted a spiral spring, $o$, and on the end is an enlarged portion or button. The rod $n^2$ is made to project a little beyond the arm $n'$, and a pin is inserted in the projecting end to prevent its being withdrawn.

Immediately above the arm $n'$ is a strip of spring metal, $n^3$, secured to the part $n$, and extending inwardly over the edge of the call-wheel $c$ and close to its surface, so arranged as to engage the post $k$ when the call-wheel is revolved. To provide for releasing this spring from engagement with the post $k$ the spring is bent downward at the end of the rod $n^2$, so that when the rod is pressed inward, its end coming in contact with the bent portion of the spring raises it sufficiently to allow the post to pass under it. By placing the post $k$ at the proper point on the call-wheel the distance to be traversed by the wheel before it is locked can be established, and thus the turning of the pointer in any given instrument beyond the desired locking-point prevented until the locking device is disengaged. The portion of the spring-plate $n^3$ under which when raised the post $k$ passes should be wide enough so that the post $k$ cannot pass beyond it. The wheel $c$ in its return movement will slide the post $k$ from under the plate $n^3$.

In the instrument illustrated in the drawings the post $k$ and spring $n^3$ are so arranged relatively to one another that the pointer will be stopped when it has been turned to the service indicated by the figure 9. If it be desired to signal number 10, which, for illustration, is made a fire-signal, it is only necessary to press upon the button of rod $n^2$, when the post $k$ will pass under the spring-plate $n^3$. When the button is released, the plate $n^3$ will rest upon the post $k$, which will slide from under the plate as the call-wheel turns back.

The improvements are illustrated in connection with a signal-box of the form commonly known as being made under the Field and Firman patents, for which instrument they are specially adapted.

I am aware that prior to my invention stops were used in signal-boxes. I therefore do not claim the same, broadly; but What I do claim as my invention, and desire to secure by Letters Patent, is—

In combination with a signal-box, the stop D, composed of the part $n$, tube $n'$, rod $n^2$, spiral spring $o$, and spring-plate $n^3$, substantially as and for the purpose set forth.

WILLIAM B. PALMER.

Witnesses:
 HOWE PAIGE,
 J. F. COLLOM.